UNITED STATES PATENT OFFICE.

WARREN F. BLEECKER, OF CANONSBURG, PENNSYLVANIA.

PROCESS OF PRODUCING ZINC FROM BLUE POWDER.

1,066,787.  Specification of Letters Patent.  Patented July 8, 1913.

No Drawing.   Application filed January 22, 1913.   Serial No. 743,658.

*To all whom it may concern:*

Be it known that I, WARREN F. BLEECKER, a citizen of the United States, residing at Canonsburg, in the county of Washington and State of Pennsylvania, have invented certain new and useful Improvements in Processes of Producing Zinc from Blue Powder, of which the following is a specification.

My invention relates to a process of producing zinc from blue powder. This powder which is a by-product obtained in the process of smelting zinc, consists of metallic zinc particles each of which is surrounded by a coating of oxid or other substance which, while very thin, is sufficient to absolutely prevent the zinc particles from fusing together to form spelter and it is the object of my invention to provide a simple method by which the coating which surrounds the zinc particles contained in blue powder is dissolved, thus allowing the said particles to fuse together when subjected to heat of the required temperature.

My process consists in brief, in placing the blue powder in a fused bath adapted to dissolve the coating which surrounds the zinc particles and allowing the said particles to fuse together at the temperature of molten zinc. This bath may consist of a suitable flux or it may be an electrolyte such as sodium zincate or sodium fluorid which is subjected to decomposition by a direct electric current. The blue powder is in this case, placed in the crucible of an electric furnace, together with a small quantity of the electrolyte and the receptacle is in the electrolytic action, connected to constitute the cathode while the anode is preferably provided by a compound of carbon, graphite or other similar substance. The electrolyte when subjected to a direct electric current, dissolves the coating which surrounds the metallic zinc particles and the latter when thus uncovered are fused together to form spelter.

While the current density at the cathode may be varied to suit different conditions, I have found a density of about three hundred and fifty amperes per square foot, well adapted to produce the desired result, under ordinary circumstances.

In the process of smelting zinc as practised at present, the product consists approximately of 95% spelter and 5% blue powder, which latter is subsequently redistilled to recover the zinc contained therein and it will be understood that while my process as above described, may be effectively used for the independent treatment of blue powder, it is particularly adapted for use in connection with any zinc-smelter to eliminate the necessity of redistilling the blue powder, as is done at present.

Having thus described my invention what I claim and desire to secure by Letters-Patent is:

1. The process of producing zinc from blue powder consisting in removing the coating of the particles of blue powder, by electrolysis in a fused bath.

2. The process of producing zinc from blue powder consisting in removing the coating of the particles of blue powder and fusing the uncovered zinc particles by treatment of the powder with a flux at a fusing temperature.

3. The process of producing zinc from blue powder consisting in removing the coating of the particles of blue powder and fusing the uncovered zinc particles by subjecting the blue powder to electrolysis by immersion in an electrolyte at a fusing temperature.

4. The process of producing zinc from blue powder consisting in removing the coating of the particles of blue powder by subjecting the latter to electrolysis in a fused bath in the presence of the electrolyte.

5. The process of producing zinc from blue powder consisting in removing the coating of the particles of blue powder and fusing the uncovered zinc particles by placing the blue powder in a receptacle containing a suitable electrolyte, electrolyzing the latter with a direct electric current, and subjecting the receptacle to heat of a fusing temperature.

6. The process of producing zinc from blue powder consisting in removing the coating of the particles of blue powder by placing the latter in a receptacle containing a suitable electrolyte, and electrolyzing the latter by constituting the said receptacle, a cathode in connection with a suitable anode.

7. The process of producing zinc from blue powder consisting in removing the coating of the particles of blue powder by placing the latter in a receptacle containing a suitable electrolyte, and electrolyzing the latter with a direct electric current.

8. The process of producing zinc from blue powder consisting in subjecting the blue powder to the action of an agent which will successively remove the coatings of the particles of blue powder and fuse the uncovered zinc particles.

9. The process of producing zinc from blue powder consisting in removing the coating of the particles of blue powder, by electrolysis in a fused bath of zinc chlorid.

In testimony whereof I have affixed my signature in presence of two witnesses.

WARREN F. BLEECKER.

Witnesses:
W. C. BLACK,
MARVIN L. CASE.